US009954808B2

(12) United States Patent
Lan et al.

(10) Patent No.: US 9,954,808 B2
(45) Date of Patent: *Apr. 24, 2018

(54) COLLECTING MESSAGES FROM A GROUP CHAT WINDOW THAT MENTION A SPECIFIC USER

(71) Applicant: International Business Machines Corporation, Armonk, NY (US)

(72) Inventors: Yan Lan, Shenzhen (CN); Qian Cheng Liao, Wuhan (CN); Li Wang, Beijing (CN); Xiao Li Wang, Beijing (CN); Jun Qing Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/748,869

(22) Filed: Jun. 24, 2015

(65) Prior Publication Data

US 2016/0380940 A1 Dec. 29, 2016

(51) Int. Cl.
*G06F 15/16* (2006.01)
*H04L 12/58* (2006.01)
(Continued)

(52) U.S. Cl.
CPC ............ *H04L 51/16* (2013.01); *G06F 17/279* (2013.01); *G06F 17/30339* (2013.01);
(Continued)

(58) Field of Classification Search
CPC ......... H04L 12/58; H04L 29/08; H04L 51/16; H04L 51/046; H04L 51/04; H04L 67/22;
(Continued)

(56) References Cited

U.S. PATENT DOCUMENTS 7,426,540 B1  9/2008  Matsumoto et al.
7,734,704 B2  6/2010  Chen et al.
(Continued)

FOREIGN PATENT DOCUMENTS

CN  105099877 A  11/2015
EP  2560104 A2  2/2013
(Continued)

OTHER PUBLICATIONS

IBM, "List of IBM Patents or Patent Applications Treated as Related (Appendix P)," Oct. 7, 2016, p. 1-2.
(Continued)

*Primary Examiner* — Benjamin M Thieu
(74) *Attorney, Agent, or Firm* — Michael O'Keefe

(57) ABSTRACT

Collecting online group chat messages. The method may include receiving a message associated with an online group chat session between chat participants. The method may also include determining the received message satisfies at least one message collection rule. The method may further include recording the received message to at least one message table based on each chat participant mentioned in the received message. The method may also include determining a first chat participant chooses to open a private chat session with at least one second chat participant. The method may further include identifying recorded messages within the message tables associated with the at least one second chat participant. The method may also include displaying the identified recorded messages in a private chat session sub-window.

20 Claims, 11 Drawing Sheets

(51) Int. Cl.
*H04L 29/08* (2006.01)
*G06F 17/30* (2006.01)
*G06F 17/27* (2006.01)
*G06K 9/00* (2006.01)

(52) U.S. Cl.
CPC ........ G06K 9/00442 (2013.01); H04L 51/046 (2013.01); H04L 67/22 (2013.01)

(58) Field of Classification Search
CPC ............. G06F 17/279; G06F 17/30339; G06F 3/0482; G06K 9/00442
See application file for complete search history.

(56) References Cited

U.S. PATENT DOCUMENTS

| | | | |
|---|---|---|---|
| 7,945,620 B2 | 5/2011 | Bou-Ghannam et al. | |
| 8,832,569 B2 | 9/2014 | Chen et al. | |
| 8,903,922 B2 | 12/2014 | Wyatt | |
| 9,330,378 B2 | 5/2016 | Bastide et al. | |
| 9,461,947 B1 | 10/2016 | Lan et al. | |
| 2003/0101343 A1* | 5/2003 | Eaton | H04L 51/04 713/170 |
| 2004/0203942 A1* | 10/2004 | Dehlin | H04L 51/04 455/466 |
| 2007/0288560 A1* | 12/2007 | Bou-Ghannam | G06Q 10/107 709/204 |
| 2008/0028031 A1 | 1/2008 | Bailey et al. | |
| 2008/0120374 A1* | 5/2008 | Kawa | H04L 63/104 709/204 |
| 2008/0208984 A1 | 8/2008 | Rosenberg et al. | |
| 2010/0005402 A1 | 1/2010 | George et al. | |
| 2013/0110946 A1 | 5/2013 | Bradshaw | |
| 2013/0173729 A1 | 7/2013 | Starenky et al. | |
| 2013/0246525 A1 | 9/2013 | Patil et al. | |
| 2014/0298210 A1 | 10/2014 | Park et al. | |
| 2014/0359487 A1 | 12/2014 | Lee | |
| 2015/0200879 A1 | 7/2015 | Wu et al. | |
| 2015/0339373 A1 | 11/2015 | Carlson et al. | |
| 2016/0241494 A1 | 8/2016 | Badge et al. | |
| 2016/0277329 A1* | 9/2016 | Gordon | H04W 4/12 |
| 2016/0277335 A1 | 9/2016 | Cheung | |

FOREIGN PATENT DOCUMENTS

| | | |
|---|---|---|
| WO | 2013030829 A1 | 3/2013 |
| WO | 2016179235 A1 | 11/2016 |

OTHER PUBLICATIONS

Lan et al., "Collecting Messages From a Group Chat Window That Mention a Specific User," Application and Drawings, filed Aug. 17, 2016, 39 Pages, U.S. Appl. No. 15/239,298.

Lan et al., "Collecting Messages From a Group Chat Window That Mention a Specific User," Application and Drawings, filed Sep. 26, 2016, 39 Pages, U.S. Appl. No. 15/276,101.

IBM, "List of IBM Patents or Patent Applications Treated as Related (Appendix P)," Apr. 22, 2016, p. 1-2.

Lan et al., "Collecting Messages From a Group Chat Window That Mention a Specific User," Application and Drawings, filed Mar. 30, 2016, 39 Pages, U.S. Appl. No. 15/085,532.

IBM, "A System & Method for Sender Awareness of Unread Messages for Notification, Preserving & Retrieving Unread IM Messages," An IP.com Prior Art Database Technical Disclosure, Aug. 27, 2008, p. 1-9, IP.com No. 000174119.

Mell et al., "The NIST Definition of Cloud Computing," National Institute of Standards and Technology, Sep. 2011, p. 1-3, Special Publication 800-145.

* cited by examiner

COLLECTING MESSAGES FROM A GROUP CHAT WINDOW THAT MENTION A SPECIFIC USER

FIELD OF INVENTION

The present invention relates generally to the field of computing, and more particularly to an online group chat.

BACKGROUND

An online chat may refer to communication over the internet where messages are transmitted from a sender to a receiver in real time. A group chat session may refer to an online chat between a sender and more than one receiver. A private chat session may refer to an online chat between one sender and at least one receiver that may not be viewable by other users. An online chat session may be text-based, audio-based, or video-based. Chat programs, such as Skype® (Skype and all Skype-based trademarks and logos are trademarks or registered trademarks of Skype and/or its affiliates) and IBM Sametime® (IBM Sametime and all IBM Sametime-based trademarks and logos are trademarks or registered trademarks of International Business Machines Corporation and/or its affiliates) may be capable of hosting online chat sessions.

SUMMARY

According to one embodiment, a method for collecting a plurality of online group chat messages. The method may include receiving a message associated with an online group chat session between a plurality of chat participants. The method may also include determining the received message satisfies at least one of a plurality of message collection rules. The method may further include recording the received message to at least one of a plurality of message tables based on each of the plurality of chat participants mentioned in the received message. The method may also include determining a first chat participant within the plurality of chat participants chooses to open a private chat session with at least one second chat participant within the plurality of chat participants. The method may further include identifying a plurality of recorded messages within the plurality of message tables associated with the at least one second chat participant. The method may also include displaying the plurality of identified recorded messages in a private chat session sub-window.

According to another embodiment, a computer system for collecting a plurality of online group chat messages. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a message associated with an online group chat session between a plurality of chat participants. The computer system may also include determining the received message satisfies at least one of a plurality of message collection rules. The computer system may further include recording the received message to at least one of a plurality of message tables based on each of the plurality of chat participants mentioned in the received message. The computer system may also include determining a first chat participant within the plurality of chat participants chooses to open a private chat session with at least one second chat participant within the plurality of chat participants. The computer system may further include identifying a plurality of recorded messages within the plurality of message tables associated with the at least one second chat participant. The computer system may also include displaying the plurality of identified recorded messages in a private chat session sub-window.

According to yet another embodiment, a computer program product for collecting a plurality of online group chat messages. The computer program product may include one or more computer-readable storage devices and program instructions stored on at least one of the one or me tangible storage devices, the program instructions executable by a processor. The computer program product may include program instructions to receive a message associated with an online group chat session between a plurality of chat participants. The computer program product may also include program instructions to determine the received message satisfies at least one of a plurality of message collection rules. The computer program product may further include program instructions to record the received message to at least one of a plurality of message tables based on each of the plurality of chat participants mentioned in the received message. The computer program product may also include program instructions to determine a first chat participant within the plurality of chat participants chooses to open a private chat session with at least one second chat participant within the plurality of chat participants. The computer program product may further include program instructions to identify a plurality of recorded messages within the plurality of message tables associated with the at least one second chat participant. The computer program product may also include program instructions to display the plurality of identified recorded messages in a private chat session sub-window.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
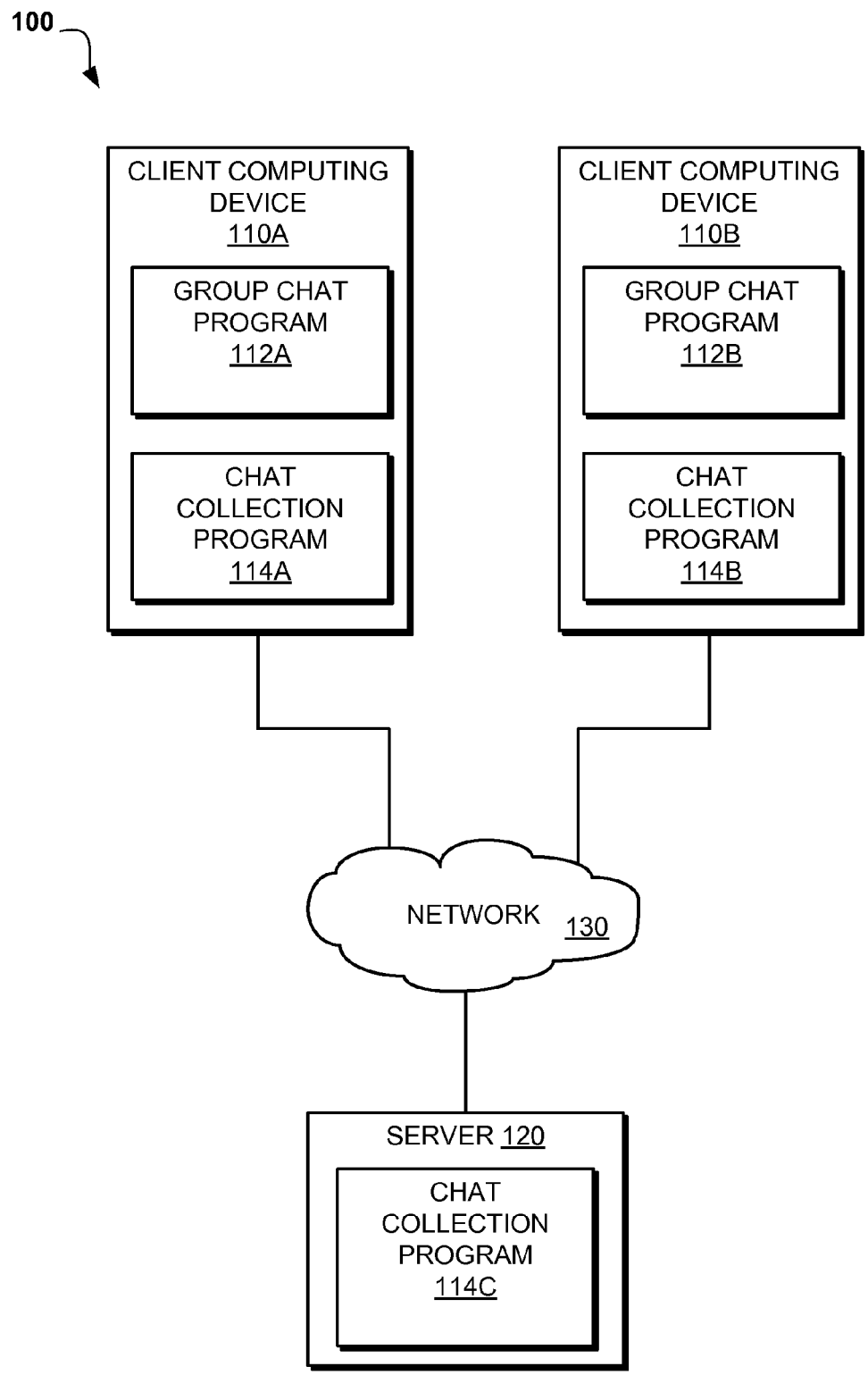
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to an online group chat. The following described exemplary embodiments provide a system, method, and program product to, among other things, collect specific user chat history data to present in a private chat sub-window. Therefore, the present embodiment has the capacity to improve the technical field of an online group chat by allowing a user's chat history to be gathered and displayed within a private chat sub-window so that a private chat conversation between two or more users may include historical chat data from the group chat.

As previously described, an online chat may refer to communication over the internet where messages are transmitted from a sender to a receiver in real time. A group chat session may refer to an online chat between a sender and more than one receiver. A private chat session may refer to an online chat between one sender and at least one receiver that may not be viewable by other users. Chat programs, such as Skype® and IBM Sametime® may be capable of hosting online chat sessions, including group chat sessions and private chat sessions.

Chat programs may allow group chat sessions among a large number of users. For example, a large company organizational meeting with individuals located in a number of geographical locations may use a chat program to host a meeting in a group chat session. During such large group chat sessions, messages directed to individual users may be unseen by the user to which the message was directed and then lost in the chat history log. For example, if User A sends a message directed to User B during an organizational group chat session among 30 users, User B may not see the message since User B may be preoccupied by an important task. When User B observes the most recent chat history, User B realizes a message directed to him was missed. However, User B may be unable to locate the message from User A due to the number of subsequent messages within the chat history log.

Furthermore, a message may be posted to a group chat that precipitates the user to begin a private chat session with one or more other users. To start the private chat session, a user may open a new chat window and invite the desired user or users to the private chat. However, since the private chat window is a new chat session, previous user chat history data may not be included in the private chat window. As such, it may be advantageous, among other things, to implement a system that allows a user to collect chat history data from a group chat session in order to open a private chat sub-window that includes the specific user chat history.

According to one embodiment, when messages are delivered to a group chat session that are directed to specific users in the group chat session. The messages directed to specific users may be collected and displayed in a private chat session sub-window between the user that sent the message and the user to which the message was directed. Therefore, a chat history log of the public group chat session may be included before the commencement of a private chat session between the users to facilitate adequate context and recollection of earlier chat communications between the users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to collect specific user chat history data to present in a private chat sub-window. According to at least one implementation, the present embodiment may gather messages that mention a specific user from a group chat session using a specific set of collection rules to determine the appropriate messages to gather. A private chat sub-window may then be created to allow a private chat session between invited users from the group chat session. Additionally, the gathered messages may be inserted into the newly created private chat sub-window to allow the users to view a chat log of messages referencing themselves.

Referring to FIG. 1, an exemplary networked computer environment 100 is depicted, in accordance with one embodiment. The networked computer environment 100 may include client computing device 110A, 110B and server 120 interconnected via communication network 130. According to at least one implementation, networked computer environment 100 may include a plurality of client computing devices 110A, 110B, only two of which are shown for illustrative brevity. Networked computer environment 100 may also include a plurality of servers 120, only one of which is shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110A, 110B may be, for example, a mobile device, a telephone, a personal digital assistant, a netbook, a laptop computer, a tablet computer, a desktop computer, or any type of computing device capable of running a program and accessing a network. Client computing device 110A, 110B may be capable of hosting group chat program 112A, 112B, chat collection program 114A, 114B, 114C, and communicating with server 120 via network 130, in accordance with one embodiment of the invention. As will be discussed with reference to FIG. 9, client computing device 110A, 110B may include internal components 902a and external components 904a, respectively.

Server computer 120 may be a laptop computer, netbook computer, personal computer (PC), a desktop computer, or any programmable electronic device capable of hosting chat collection program 114A, 114B, 114C and communicating with client computing device 110A, 110B via network 130, in accordance with embodiments of the invention. As will be discussed with reference to FIG. 9, server computer 120 may include internal components 902b and external components 904b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, group chat program 112A, 112B, such as Skype® and IBM Sametime®, may be a program capable of allowing users to send and receive messages through a graphical user interface. Messages sent through group chat program 112A, 112B may include text, images, and video. Messages sent and received by users using group chat program 112A, 112B may be posted to a community chat window.

Chat collection program 114A, 114B, 114C may be a program capable of collecting messages within a community chat window, creating a private chat sub-window, inviting group chat participants to a private chat, and populating the private chat sub-window with messages from a public group chat that mentions users invited to the private chat. Chat collection program 114A, 114B, 114C is explained in further detail below with respect to FIG. 2 and FIG. 3.

Figure 2:
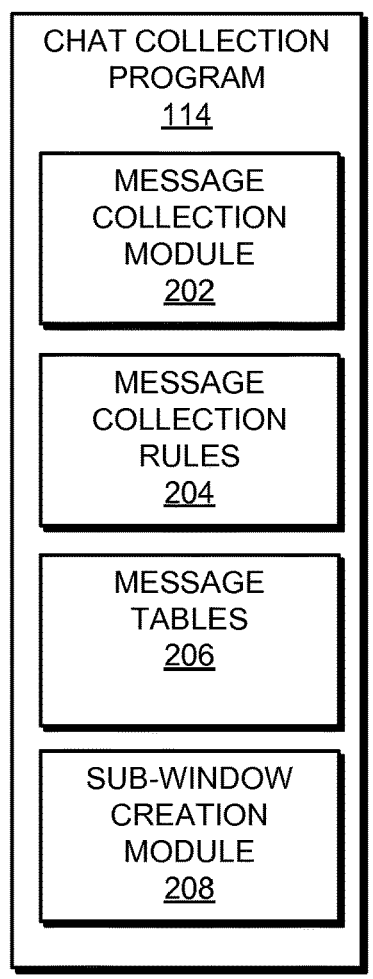
FIG. 2 is a functional block diagram of the components within a chat collection program, in accordance with one embodiment of the present embodiment.

Referring now to FIG. 2, a function block diagram 200 of the components within a chat collection program is depicted, in accordance with one embodiment of the present invention. Chat collection program 114A, 114B, 114C may implement message collection module 202, message collection rules 204, message tables 206, and sub-window creation module 208 to collect messages from a group chat window and populate a private chat sub-window with the collected messages.

According to the present embodiment, message collection rules 204 may be a set of preconfigured rules or protocols used to collect and categorize messages when a message is submitted into a group chat. For example, when User A submits a message to group chat program 112A, 112B, message collection rules 204 may be implemented to analyze the submitted message and collect and categorize the message based on other users mentioned within the message.

Message collection module 202 may be program capable of collecting user messages within a group chat based on message collection rules 204. Message collection module 202 may save the collected messages to message tables 206.

Message tables 206 may be data structures utilized to store messages collected by message collection rules 204. The messages stored within message tables 206 may be stored based on category, such as user referenced within message or user sending the message, or by the specific rule within message collection rules 204 used to collect each message. Furthermore, message tables 206 may include data categorized into sub-tables based on preconfigured criteria, such as timestamp or the group chat participants.

Sub-window creation module 208 may be a module that creates a private chat session sub-window within group chat program 112A, 112B between two or more group chat session participants. Sub-window creation module 208 may analyze message tables 206 to determine particular messages to display in the private chat session sub-window based on user selections. Sub-window creation module 208 may then populate the private chat session window with the determined messages from message tables 206.

Figure 3:
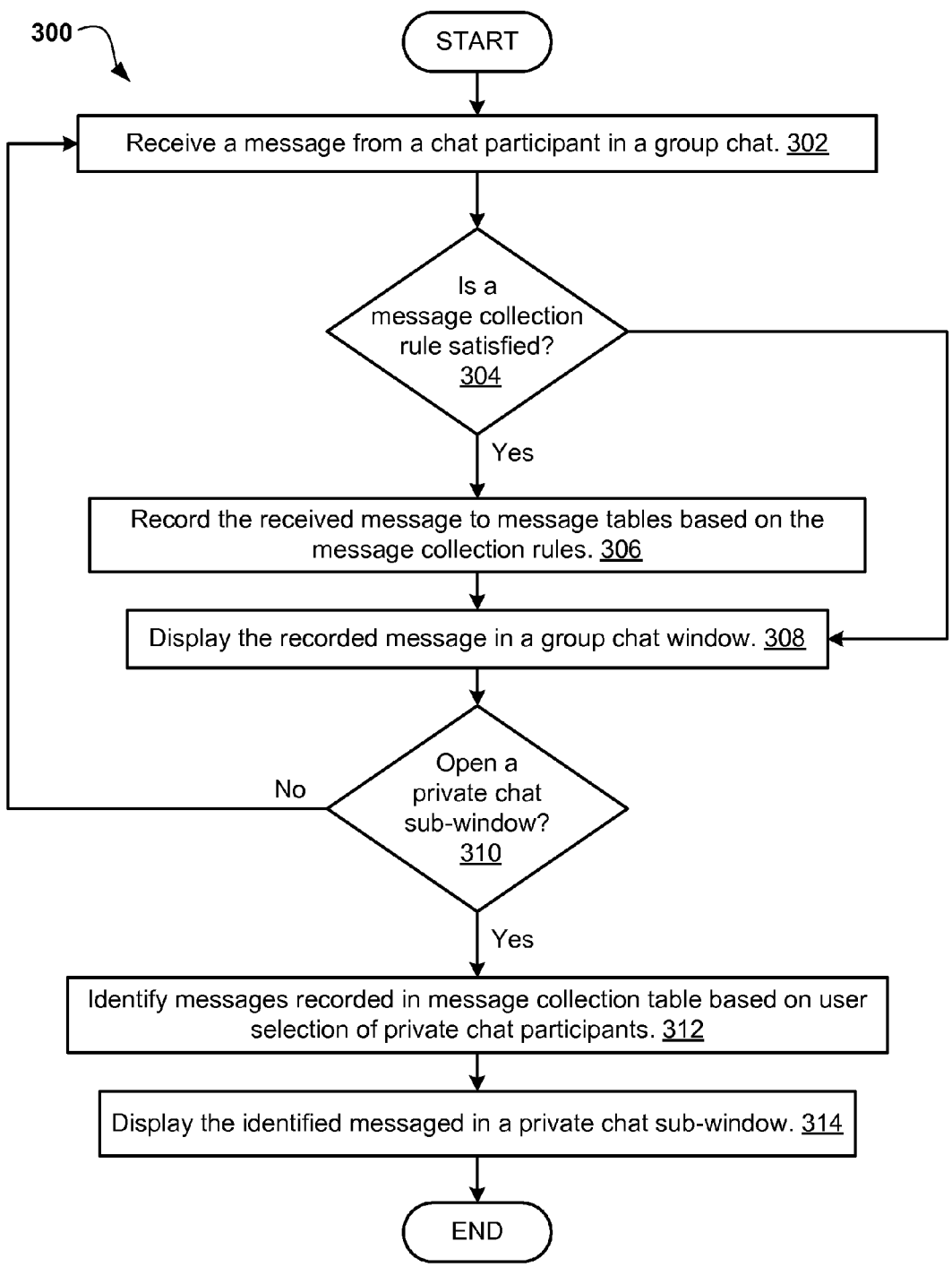
FIG. 3 illustrates a flowchart of the operational steps carried out by a program to collect specific chat history data into a chat sub-window, in accordance with one embodiment of the present invention.

Referring now to FIG. 3, a flowchart 300 of the operational steps carried out by a program to collect specific chat history data into a chat sub-window is depicted, in accordance with one embodiment of the present invention. At 302, a chat message may be received by group chat program 112A, 112B. During the course of a group chat session, participants may submit chat messages to group chat program 112A, 112B. For example, User A may be participating in a Skype® chat session with other department members. During the course of the chat session, User A may submit a message to the group chat session by using the graphical user interface associated with group chat program 112A, 112B.

Then at 304, chat collection program 114A, 114B, 114C utilizing chat collection module 202 may determine if a message collection rule is satisfied. According to one implementation, the method may continue along operational flowchart 300, if a preconfigured message collection rule within message collection rules 204 is satisfied. If chat collection program 114A, 114B, 114C determines a message collection rule within message collection rules 204 is satisfied (step 304, "YES" branch), chat collection program 114A, 114B, 114C may continue to step 306 to record the received message to a message table. If chat collection program 114A, 114B, 114C determines a message collection rule within message collection rules 204 is not satisfied (step 304, "NO" branch), chat collection program 114A, 114B, 114C may continue to step 308 to display the received message to the group chat window.

As previously described, message collection rules 204 may be a set of preconfigured rules or protocols used to collect and categorize messages when a message is submitted into a group chat. Message collection rules 204 may be used categorize received group chat messages when the received group chat message satisfies preconfigured criteria. For example, a user preconfigured message collection rule within message collection rules 204 may specify that a message may be captured and categorized whenever a user screen name or a user's actual given name is identified in a group chat message. Therefore, if User A submits a group chat message that includes the text "@userB, how are you today?" message collection module 202 may determine that a message collection rule within message collection rules 204 has been satisfied since the group chat message from User A references another user's screen name.

Next at 306, the received chat message may be recorded by chat collection program 114A, 114B, 114C. Chat collection program 114A, 114B, 114C may utilize message collection module 202 to record the received group chat message to a message table within message tables 206 based on message collection rules 204. As previously described, message tables 206 may be a data structure used to store messages based on categories or collected rules. For example, if one or more rules within message collection rules 204 correspond to collecting message that mention User A's actual given name or User A's user screen name, then a message table within message tables 206 may correspond to User A. Therefore, whenever a rule relating to User A's actual given name or User A's user screen name is satisfied, message collection module 202 may save the group chat message satisfying the applicable rule to the message table corresponding to User A.

Then at 308, group chat program 112A, 112B may display the received group chat message in a group chat window. A received group chat message may be displayed in a group chat window on a graphical user interface associated with group chat program 112A, 112B once chat collection program 114A, 114B, 114C either determines the received group chat message does not satisfy a message collection rule within message collection rules 204 or the received group chat message does satisfy a message collection rule within message collection rules 204 and the received group chat message has been recorded to message tables 206 accordingly. For example, during a Skype® chat session, User A may post a group chat message containing the text, "Hello, everyone!" If the group chat message posted by User A does not satisfy any message collection rule within message collection rules 204, chat collection program 114A, 114B, 114C may not record the group chat message to message tables 206 and display the chat message to the group chat window within the graphical user interface associated the Skype® chat session.

Next at 310, chat collection program 114A, 114B, 114C may determine if a private chat session sub-window should be opened. According to one implementation, the method may continue along operational flowchart 300, if a private chat sub-window should be opened within group chat program 112A, 112B. If chat collection program 114A, 114B, 114C determines a private chat sub-window should be opened (step 310, "YES" branch), chat collection program 114A, 114B, 114C may continue to step 312 to identify applicable messages recorded to message tables 206 to display in the newly created private chat sub-window. If chat collection program 114A, 114B, 114C determines a private chat sub-window should not be opened (step 310, "NO" branch), chat collection program 114A, 114B, 114C may return to step 302 to receive messages submitted to the group chat session from chat participants.

Chat collection program 114A, 114B, 114C may determine that a private chat sub-window should be opened when a user selects a menu option preconfigured to group chat program 112A, 112B. For example, User A may be in a group chat session with User B and User C. If User A wishes to open a private chat sub-window with User B that includes the chat messages submitted to the group chat session by User B where User A was mentioned, User A may right click a computer mouse to open a sub-menu and select an option titled, "Create sub window." Furthermore, chat collection program 114A, 114B, 114C may automatically invite selected chat participants to the private chat session once the private chat sub-window is created based on the group chat participants selected by the user choosing to open the private chat sub-window.

Then at 312, chat collection program 114A, 114B, 114C may identify the appropriate recorded messages within message tables 206 to populate into a private chat sub-window created by sub-window creation module 208. When chat collection program 114A, 114B, 114C determines a private chat sub-window should be opened, chat collection program 114A, 114B, 114C may first create a private chat session sub-window using sub-window creation module 208 then identify the recorded messages within message tables 206 that should be displayed within the newly created private chat sub-window. Chat collection program 114A, 114B, 114C may identify the appropriate message within message tables 206 to display in the newly created private chat sub-window based on user selections. For example, when choosing to open a private chat sub-window, User A may select User B's screen name from the list of chat participants. By then selecting the "Create sub window" option, chat collection program 114A, 114B, 114C may determine that User A wishes to begin a private chat session with User B and display all previous messages from User B that mention User A in the private chat sub-window. Therefore, chat collection program 114A, 114B, 114C automatically invite User B to the private chat session and may then identify the appropriate messages within message tables 206 that correspond to messages sent from User B that mention User A, such as messages where User B used User A's user screen name or User A's actual given name. Additionally, chat collection program 114A, 114B, 114C may identify messages within message tables 206 that correspond to multiple users within the group chat session to display in a private chat session. For example, User A may wish to begin a private chat session with User B and User C. Therefore, chat collection program 114A, 114B, 114C may automatically invite User B and User C to a private chat session and then identify messages within message tables 206 from User B and User C that include mentions to User A to display within the newly created private chat session sub-window.

Next at 314, chat collection program 114A, 114B, 114C may display the identified messages within the newly created private chat sub-window. Once chat collection program 114A, 114B, 114C has identified messages within message tables 206 that correspond to the selected group chat participants, chat collection program 114A, 114B, 114C may create a new private chat sub-window within group chat program 112A, 112B, add the user selected group chat participants to the private chat session, and populate the private chat sub-window with the identified messages from message tables 206. For example, User A and User B may be two participants within a group chat session that includes 10 other chat participants. User A may choose to begin a private chat session with User B. Chat collection program 114A, 114B, 114C may identify messages submitted by User B to the group chat session that mention User A and are recorded within message tables 206. Chat collection program 114A, 114B, 114C may then create a private chat sub-window with User A and User B as the only participants and display the messages submitted to the group chat session where User B made mention of User A within the text of the group chat message by either using User A's screen name or User A's actual given name. Furthermore, chat collection program 114A, 114B, 114C may be preconfigured to display identified messages that make mention to all private chat participants. For example, in the previous hypothetical, chat collection program 114A, 114B, 114C may display all identified messages where User B made a mention to User A in the text of the group chat message and all identified messages where User A made a mention to User B in the text of the group chat message. Therefore, a more detailed conversation between each private chat participant may be displayed within the private chat session. Additionally, chat collection program 114A, 114B, 114C may categorize the identified messages according to metadata, such as timestamp, user mentioned in message, or user sending the message, associated with each identified message. For example, chat collection program 114A, 114B, 114C may display each identified message in timestamp order when populating the identified messages into a private chat sub-window.

Figure 4:
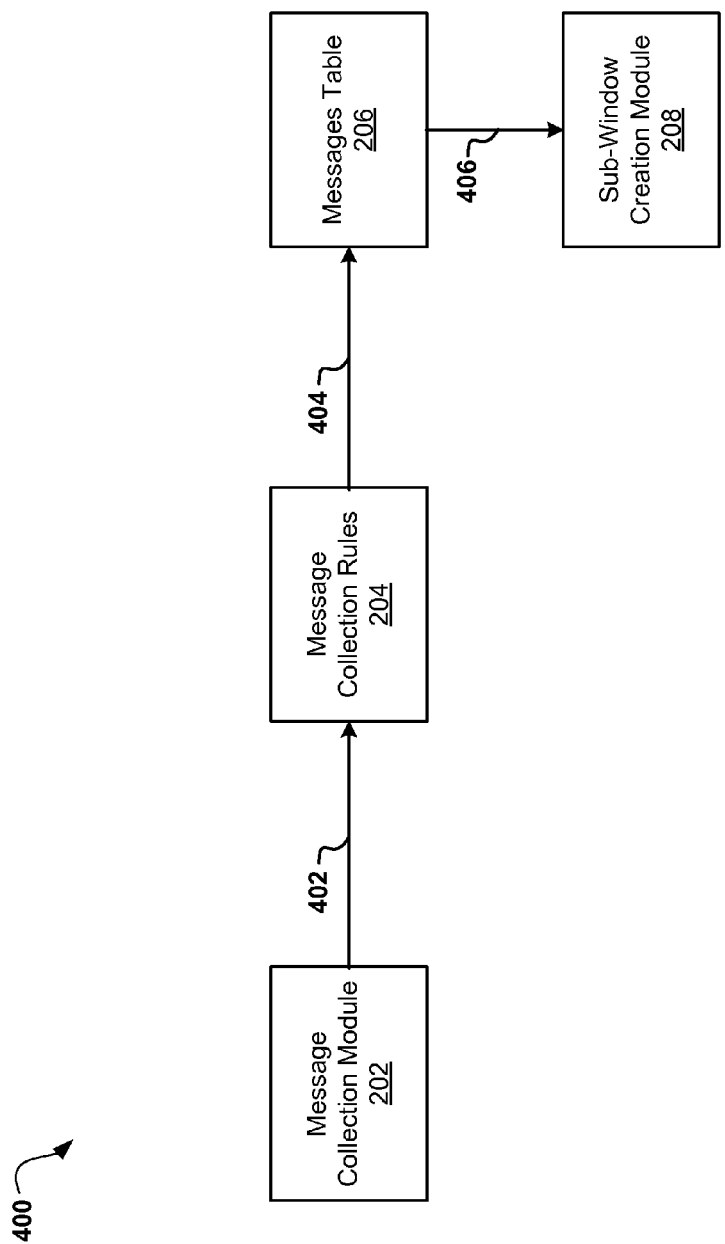
FIG. 4 is a functional block diagram of the steps implemented by a chat collection program to collect specific chat history data to display in a sub-window, in accordance with one embodiment of the present invention.

Referring now to FIG. 4, a functional block diagram 400 of the steps implemented by a chat collection program to collect specific chat history data to display in a sub-window is depicted, in accordance with one embodiment of the present invention. At 402, when a group chat message is received by message collection module 202, message collection module 202 may determine if the received message satisfies a rule within message collection rules 204. At 404, if the received message does satisfy a message collection rule within message collection rules 204, the received message may be recorded within message tables 206. At 406, when a user chooses to open a private chat sub-window, sub-window creation module 208 may extract the applicable messages within message tables 206 to display within the private chat sub-window.

Figure 5:
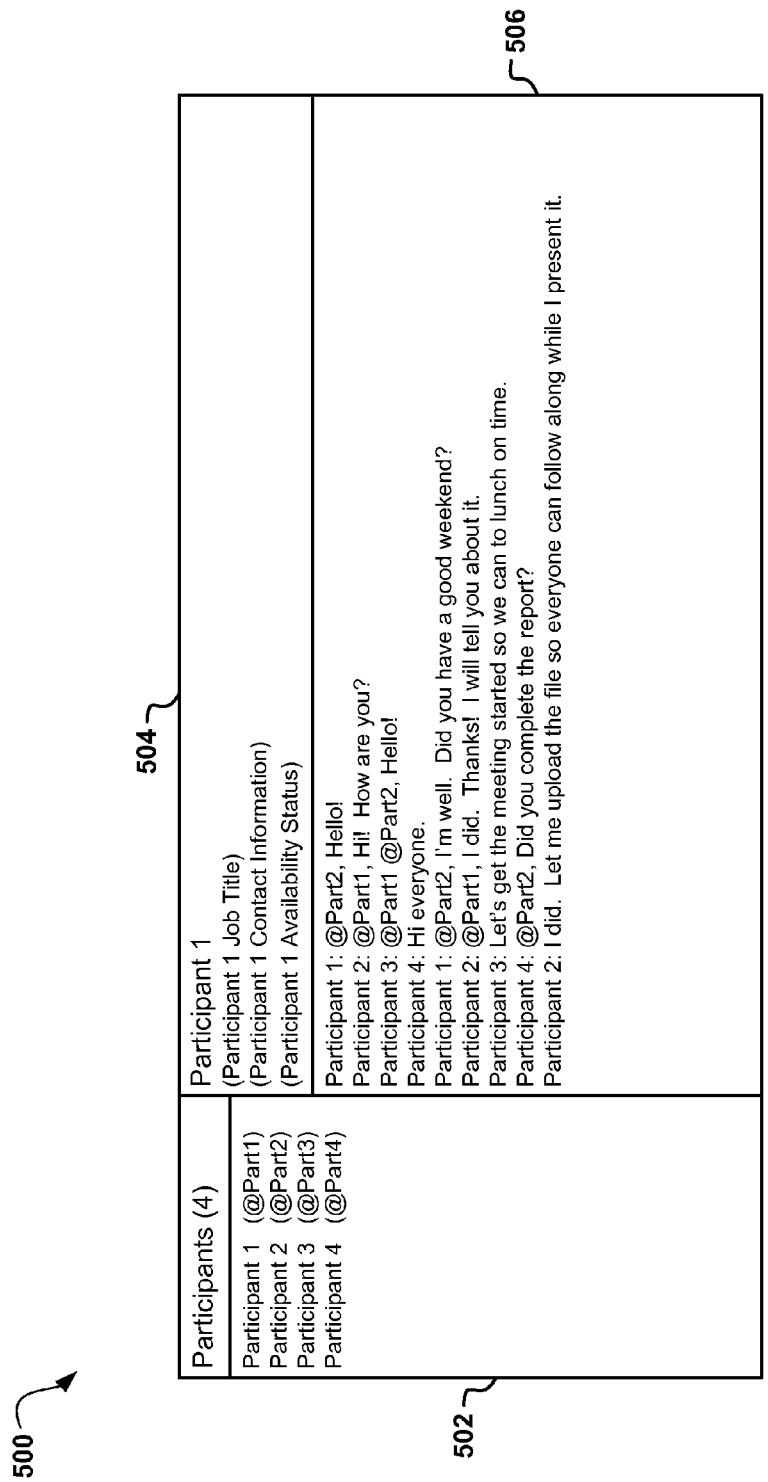
FIG. 5 is a functional block diagram of a graphical user interface of a group chat program, in accordance with one embodiment of the present invention.

Referring now to FIG. 5, a functional block diagram 500 of a graphical user interface of a group chat program is depicted, in accordance with one embodiment of the present invention. A user may interact with group chat program 112A, 112B through a graphical user interface. The graphical user interface of group chat program 112A, 112B may include group chat participant log window 502, group chat participant profile window 504, and group chat window 506. Group chat participant log window 502 may display each active participant logged into the group chat session. Group chat participant profile window 504 may include detailed profile information, such as screen name, job title, contact information, geographic location, and chat availability status, associated with a chat participant. Group chat window 506 may include an active log of all messages sent by chat participants as listed in participant log window 502. The messages included in group chat window 506 may be displayed in chronological order according to the time each message was submitted by group chat participants. Messages within group chat window 506 may include mentions, such as user screen names or actual user given names, to other users participating in the group chat session.

Figure 6:
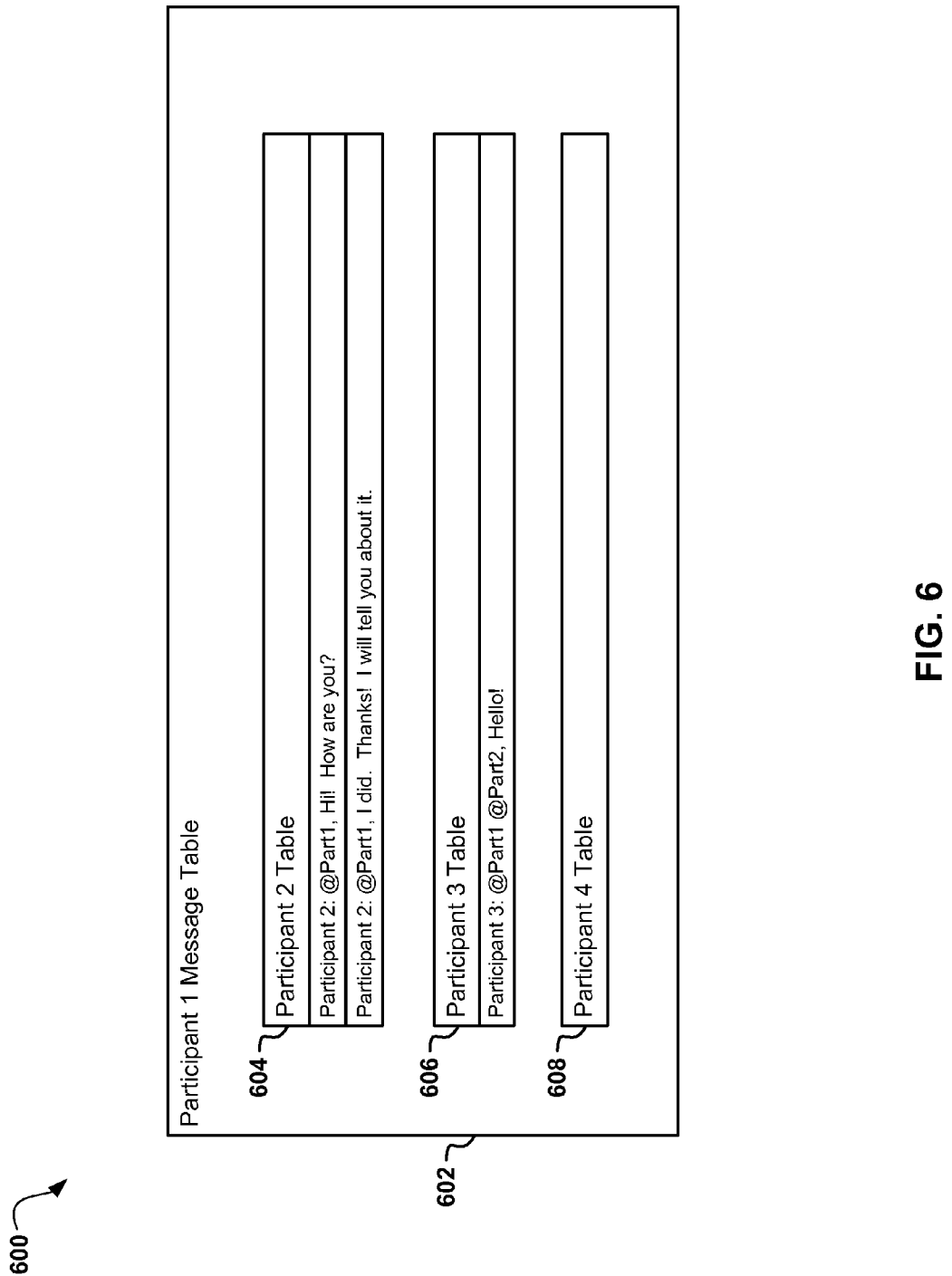
FIG. 6 is a functional block diagram of a chat participant message table, in accordance with one embodiment of the present invention.

Referring now to FIG. 6, a functional block diagram 600 of a chat participant message table, in accordance with one embodiment of the present invention. When messages are received by group chat program 112A, 112B, chat collection program 114A, 114B, 114C may determine whether the received message satisfies message collection rules 204. For example, a message collection rule within message collection rules 204 may require all received messages containing a group chat participant's screen name, such as @Part1, be recorded in message tables 206. Therefore, whenever a received message contains @Part1, Participant 1's screen name, chat collection program 114A, 114B, 114C may implement message collection module 202 to record the received messages to Participant 1 Message Table 602 within message tables 206. Furthermore, Participant 1 Message Table 602 may be further organized into sub-tables corresponding to the group chat participant that sent the message. For example, Participant 2 Table 604, Participant 3 Table 606, and Participant 4 Table 608 may display messages sent my Participant 2, Participant 3, and Participant 4, respectively, to the group chat session that contained Participant 1's screen name, @Part1.

Figure 7:
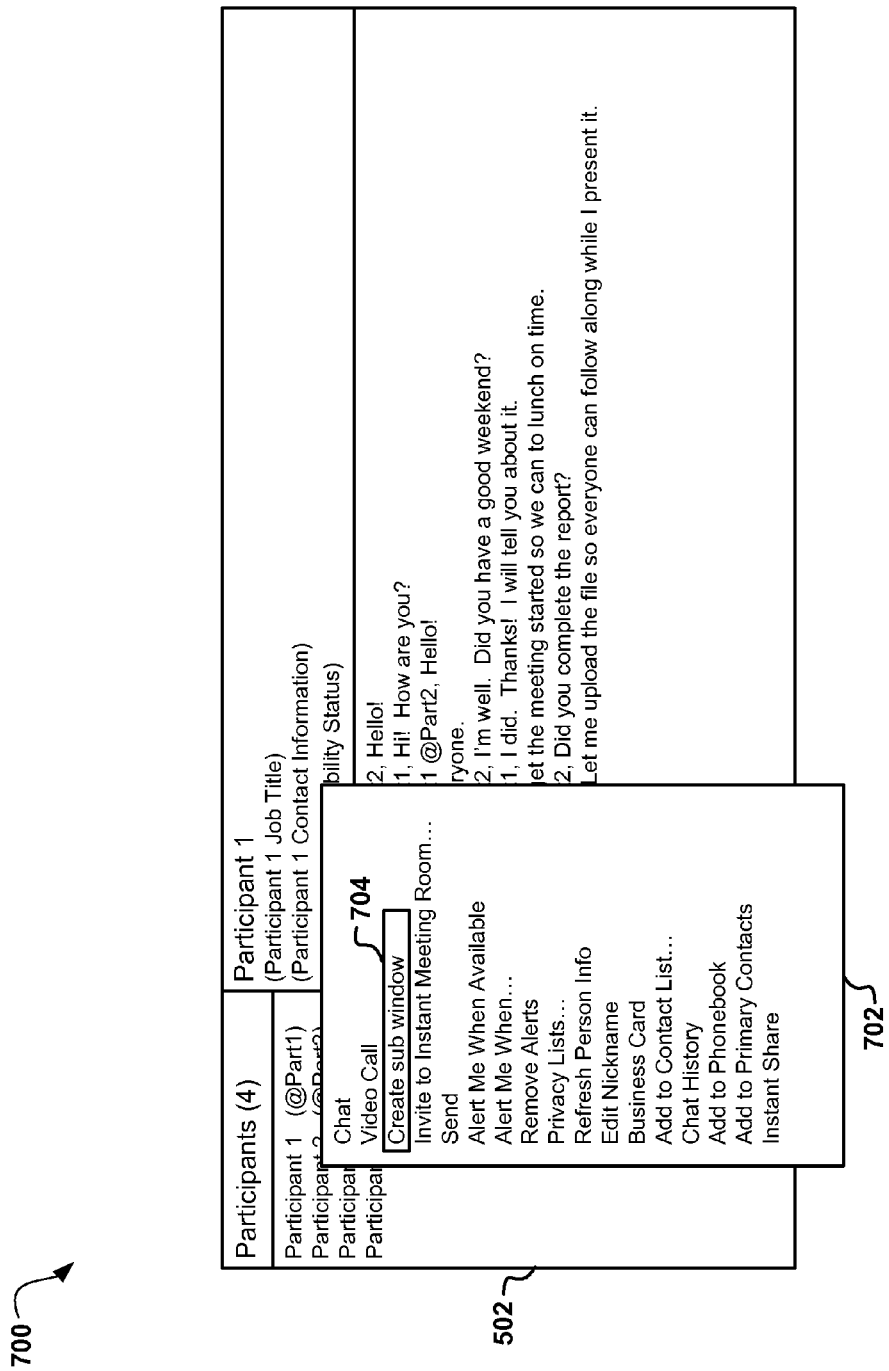
FIG. 7 is a functional block diagram of a group chat sub-menu, in accordance with one embodiment of the present invention.

Referring now to FIG. 7, a functional block diagram 700 of a group chat sub-menu is depicted, in accordance with one embodiment of the present invention. During the course of a group chat session on group chat program 112A, 112B, a user may wish to open a private chat session sub-window with another user that includes historical group chat messages from the private chat users that mention other private chat users. For example, with respect to the example scenario described in FIG. 5 and FIG. 6, Participant 1 may wish to open a private chat session with Participant 2. If Participant 1 selects Participant 2's user name on participant log window 502, sub-menu 702 may be displayed that includes options from which Participant 1 may select, such as option "Create sub window" 704. If Participant 1 selects option "Create sub window" 704 from sub-menu 702, chat collection program 114A, 114B, 114C may utilize sub-window creation module 208 to create a private chat session within a private chat sub-window with Participant 2. Similarly, Participant 1 may choose multiple group chat participants within participant log window 502 and create a private chat session with the selected group chat participants.

Figure 8:
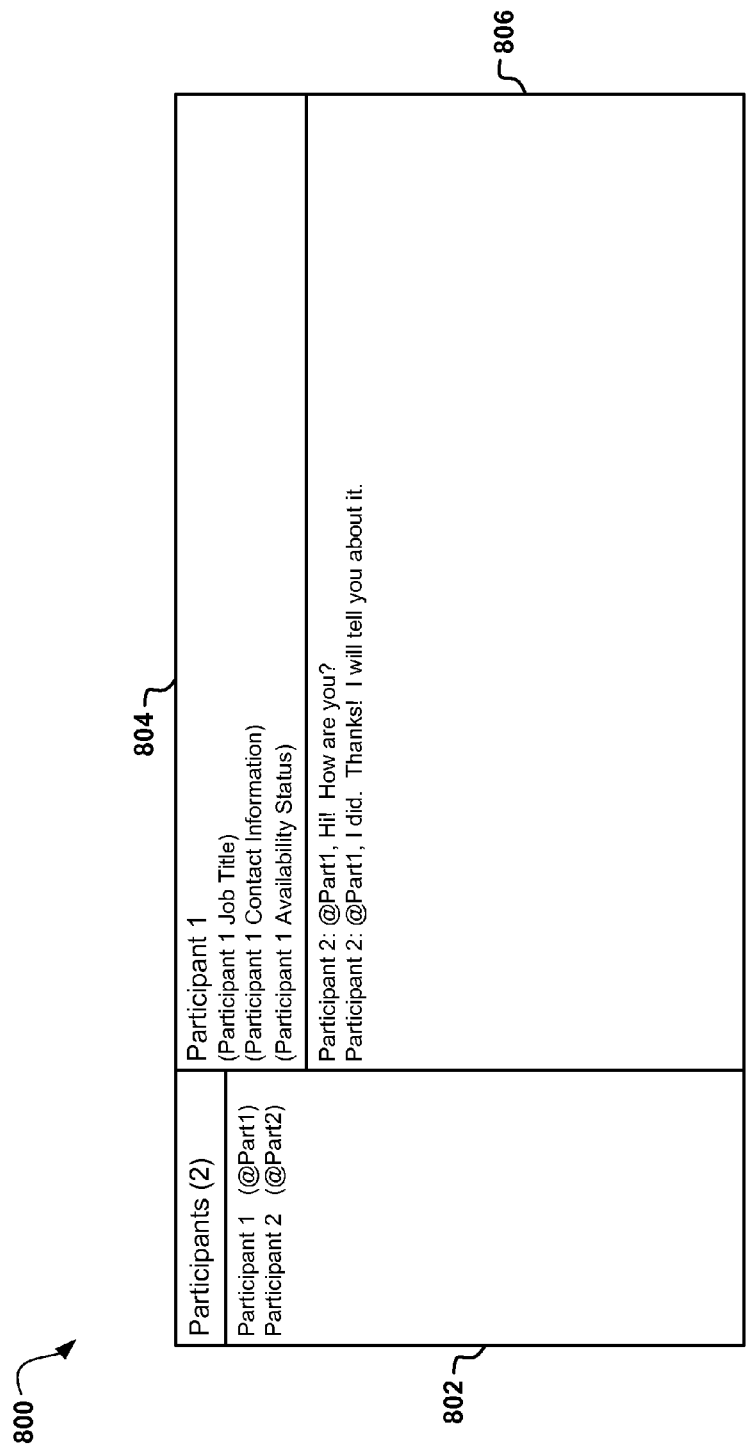
FIG. 8 is a functional block diagram of a private chat sub-window, in accordance with one embodiment of the present invention.

Referring now to FIG. 8, a functional block diagram 800 of a private chat sub-window is depicted, in accordance with one embodiment of the present invention. Continuing the example described in FIG. 5, FIG. 6, and FIG. 7, if a group chat participant, such as Participant 1, chooses to open a private chat sub-window, chat collection program 114A, 114B, 114C may use sub-window creation module 208 to create a private chat sub-window. The private chat sub-window may include private chat participant log 802, private chat participant profile window 804, and private chat window 806. Private chat participant log 802 may include a list of all participants to the private chat. Similar to group chat participant profile window 504, private chat participant profile window 804 may include detailed profile information, such as screen name, job title, contact information, geographic location, and chat availability status, associated with a private chat participant. Private chat window 806 may include private chat session messages sent between participants of the private chat session. Private chat window 806 may also include messages within message tables 206 that mention applicable participants of the private chat session. For example, if Participant 1 choose to begin a private chat session with Participant 2, chat collection program 114A, 114B, 114C may open a private chat sub-window using sub-window creation module 208 and display messages from message tables 206 where Participant 2 mentioned Participant 1 by Participant 1's user screen name, @Part1.

Figure 9:
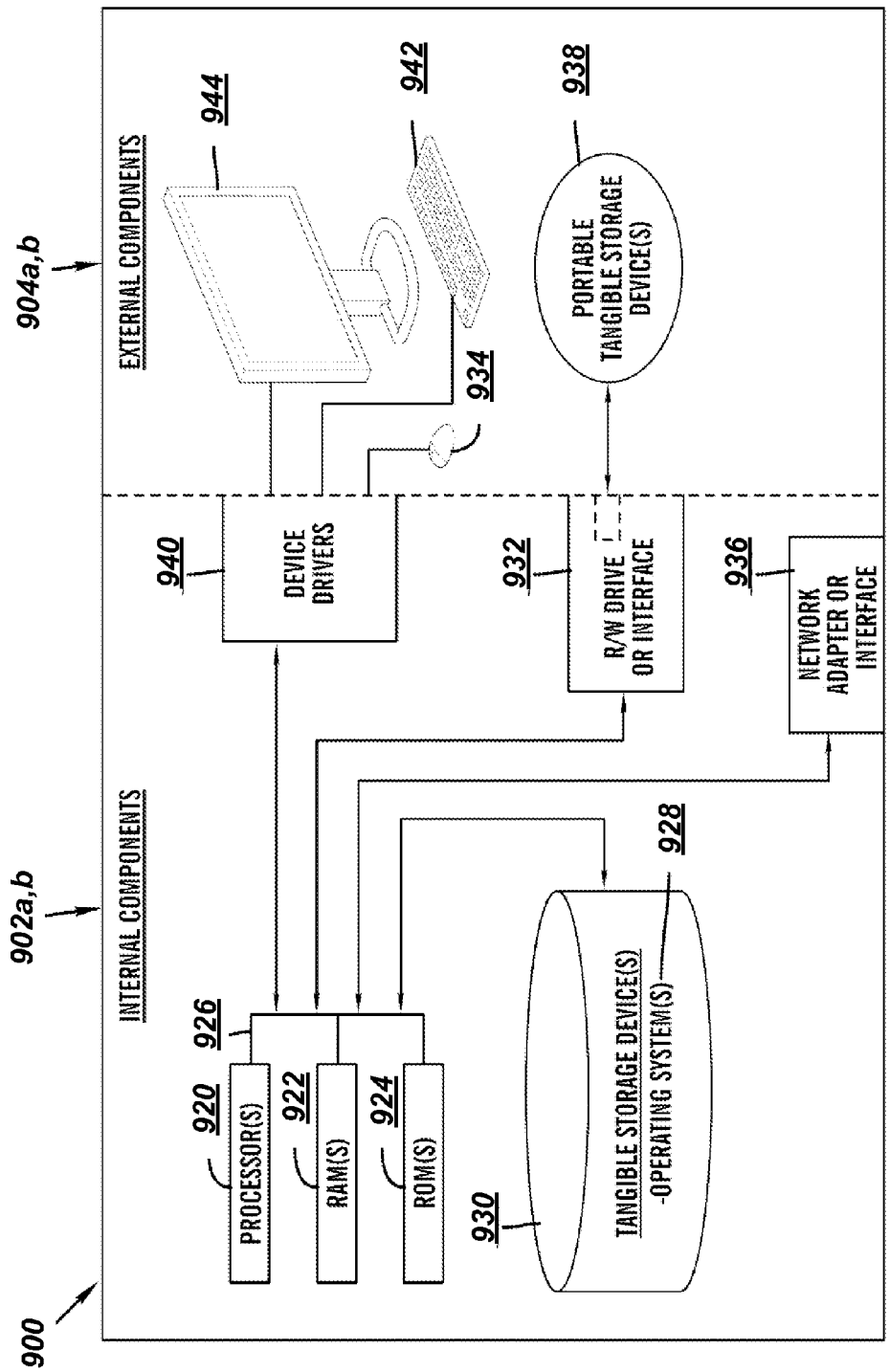
FIG. 9 depicts a cloud computing node according to an embodiment of the present invention.

FIG. 9 is a block diagram 900 of internal and external components of computer 110A, 110B and server 120 depicted in FIG. 1 in accordance with an embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110A, 110B and network server 120 may include respective sets of internal components 902 $a,b$ and external components 904 $a,b$ illustrated in FIG. 9. Each of the sets of internal components 902 include one or more processors 920, one or more computer-readable RAMs 922 and one or more computer-readable ROMs 924 on one or more buses 926, and one or more operating systems 928 and one or more computer-readable tangible storage devices 930. The one or more operating systems 928, group chat program 112A, 112B, and chat collection program 114A, 114B in client computer 110A, 110B; and chat collection program 114C in network server 120 are stored on one or more of the respective computer-readable tangible storage devices 930 for execution by one or more of the respective processors 920 via one or more of the respective RAMs 922

(which typically include cache memory). In the embodiment illustrated in FIG. 9, each of the computer-readable tangible storage devices 930 is a magnetic disk storage device of an internal hard drive. Alternatively, each of the computer-readable tangible storage devices 930 is a semiconductor storage device such as ROM 924, EPROM, flash memory or any other computer-readable tangible storage device that can store a computer program and digital information.

Each set of internal components 902 a,b also includes a R/W drive or interface 932 to read from and write to one or more portable computer-readable tangible storage devices 938 such as a CD-ROM, DVD, memory stick, magnetic tape, magnetic disk, optical disk or semiconductor storage device. A software program, such as group chat program 112A, 112B and chat collection program 114A, 114B, 114C can be stored on one or more of the respective portable computer-readable tangible storage devices 938, read via the respective R/W drive or interface 932 and loaded into the respective hard drive 930.

Each set of internal components 902 a,b also includes network adapters or interfaces 936 such as a TCP/IP adapter cards, wireless Wi-Fi interface cards, or 3G or 4G wireless interface cards or other wired or wireless communication links. Group chat program 112A, 112B and chat collection program 114A, 114B in client computer 110A, 110B and chat collection program 114C in network server 120 can be downloaded to client computer 110A, 110B and network server 120 from an external computer via a network (for example, the Internet, a local area network or other, wide area network) and respective network adapters or interfaces 936. From the network adapters or interfaces 936, group chat program 112A, 112B and chat collection program 114A, 114B in client computer 110A, 110B and chat collection program 114C in network server 120 are loaded into the respective hard drive 930. The network may comprise copper wires, optical fibers, wireless transmission, routers, firewalls, switches, gateway computers and/or edge servers.

Each of the sets of external components 904 a,b can include a computer display monitor 944, a keyboard 942, and a computer mouse 934. External components 904 a,b can also include touch screens, virtual keyboards, touch pads, pointing devices, and other human interface devices. Each of the sets of internal components 902 a,b also includes device drivers 940 to interface to computer display monitor 944, keyboard 942, and computer mouse 934. The device drivers 940, R/W drive or interface 932 and network adapter or interface 936 comprise hardware and software (stored in storage device 930 and/or ROM 924).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
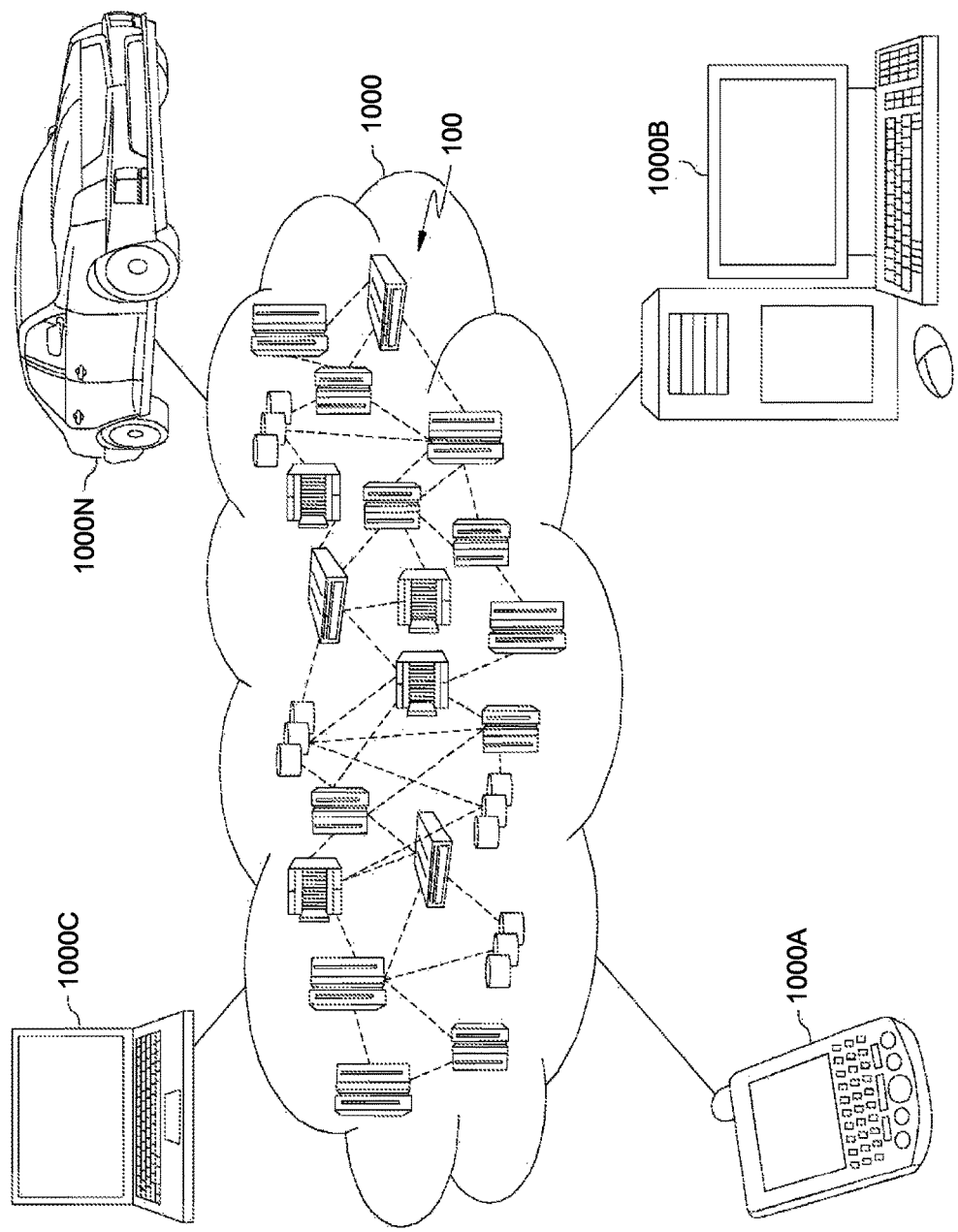
FIG. 10 depicts a cloud computing environment according to an embodiment of the present invention.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
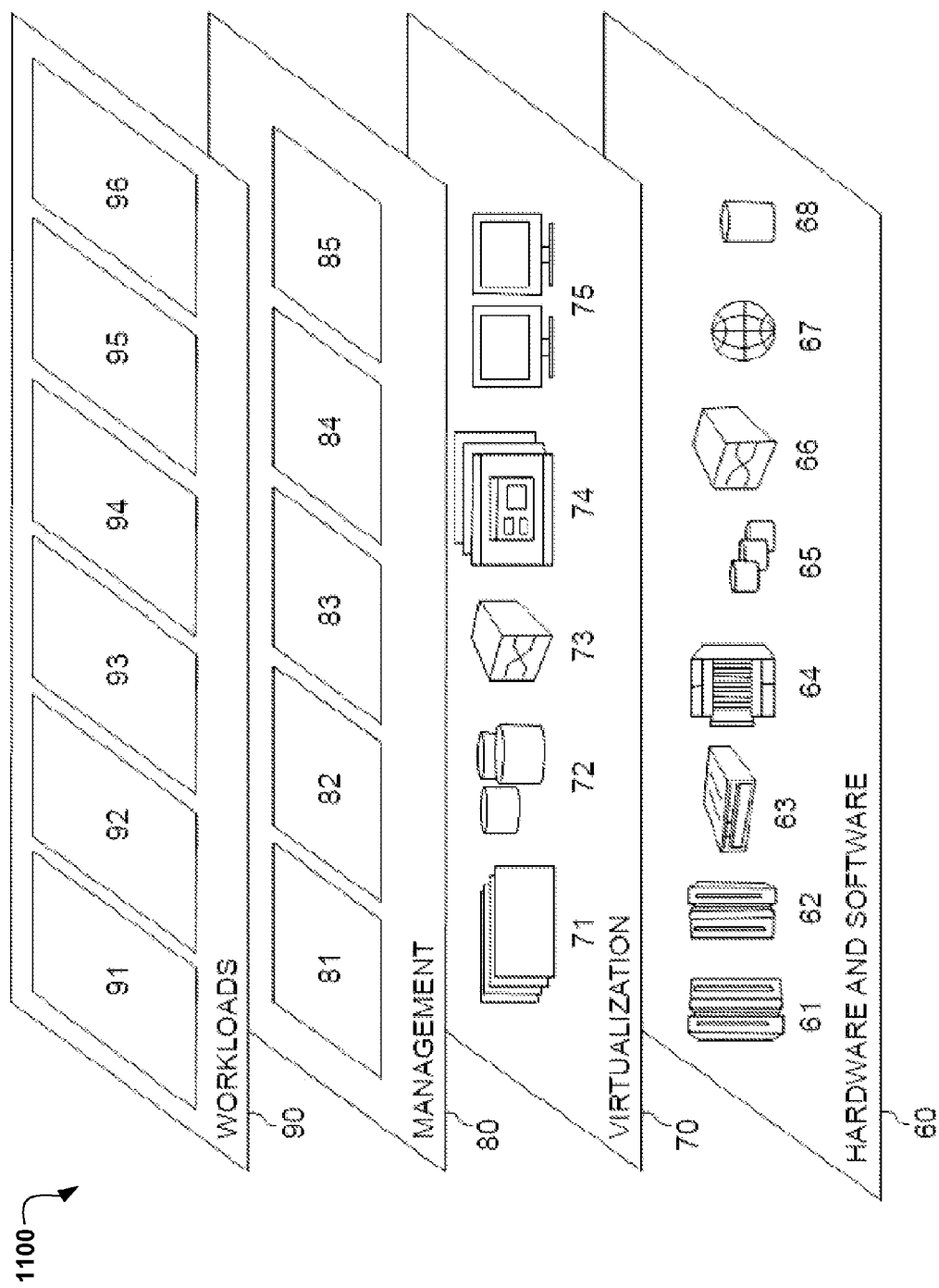
FIG. 11 depicts abstraction model layers according to an embodiment of the present invention.

Referring now to FIG. 11, a set of functional abstraction layers 1100 provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collecting group chat messages 96. Collected group chat messages may be stored within message tables according to preconfigured categories and used to display specific group chat history in a newly create private chat session between two or more chat participants.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for collecting a plurality of online group chat messages, the method comprising:
   receiving, by a processor, a message associated with an online group chat session between a plurality of chat participants;
   determining the received message satisfies at least one of a plurality of message collection rules;
   recording the received message to at least one of a plurality of message tables based on each of the plurality of chat participants mentioned in the received message;
   determining a first chat participant within the plurality of chat participants chooses to open a private chat session with a second chat participant within the plurality of chat participants;
   identifying a plurality of recorded messages within the plurality of message tables where the first chat participant typed a screen name or a given name for the second chat participant and where the second chat participant typed a screen name or a given name of the first chat participant; and
   displaying the plurality of identified recorded messages in a private chat session sub-window.

2. The method of claim 1, wherein identifying the plurality of recorded messages includes identifying the plurality of recorded messages in which the at least one second chat participant mentions the first chat participant.

3. The method of claim 1, wherein displaying the plurality of identified messages includes categorizing the plurality of identified messages based on at least one of a plurality of timestamp information and a message posting chat participant.

4. The method of claim 1, wherein the plurality of message collection rules includes at least one of a plurality of messages that include a user screen name and a plurality of messages that include a user actual given name.

5. The method of claim 1, wherein the plurality of message tables includes a plurality of sub-tables associated with at least one of each of the plurality of chat participants and a plurality of timestamp information.

6. The method of claim 1, wherein determining a first chat participant chooses to open a private chat session with at least one second chat participant includes automatically sending a private chat session invitation to the at least one second chat participant.

7. The method of claim 1, further comprising:
displaying the recorded message in a group chat session window.

8. A computer system for collecting a plurality of online group chat messages, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, by a processor, a message associated with an online group chat session between a plurality of chat participants;
determining the received message satisfies at least one of a plurality of message collection rules;
recording the received message to at least one of a plurality of message tables based on each of the plurality of chat participants mentioned in the received message;
determining a first chat participant within the plurality of chat participants chooses to open a private chat session with a second chat participant within the plurality of chat participants;
identifying a plurality of recorded messages within the plurality of message tables where the first chat participant typed a screen name or a given name for the second chat participant and where the second chat participant typed a screen name or a given name of the first chat participant; and
displaying the plurality of identified recorded messages in a private chat session sub-window.

9. The computer system of claim 8, wherein identifying the plurality of recorded messages includes identifying the plurality of recorded messages in which the at least one second chat participant mentions the first chat participant.

10. The computer system of claim 8, wherein displaying the plurality of identified messages includes categorizing the plurality of identified messages based on at least one of a plurality of timestamp information and a message posting chat participant.

11. The computer system of claim 8, wherein the plurality of message collection rules includes at least one of a plurality of messages that include a user screen name and a plurality of messages that include a user actual given name.

12. The computer system of claim 8, wherein the plurality of message tables includes a plurality of sub-tables associated with at least one of each of the plurality of chat participants and a plurality of timestamp information.

13. The computer system of claim 8, wherein determining a first chat participant chooses to open a private chat session with at least one second chat participant includes automatically sending a private chat session invitation to the at least one second chat participant.

14. The computer system of claim 8, further comprising:
displaying the recorded message in a group chat session window.

15. A computer program product for collecting a plurality of online group chat messages, the computer program product comprising:
one or more computer-readable tangible storage medium and program instructions stored on at least one of the one or more tangible storage medium, the program instructions executable by a processor, the program instructions comprising:
program instructions to receive, by a processor, a message associated with an online group chat session between a plurality of chat participants;
program instructions to determine the received message satisfies at least one of a plurality of message collection rules;
program instructions to record the received message to at least one of a plurality of message tables based on each of the plurality of chat participants mentioned in the received message;
program instructions to determine a first chat participant within the plurality of chat participants chooses to open a private chat session with a second chat participant within the plurality of chat participants;
program instructions to identify a plurality of recorded messages within the plurality of message tables where the first chat participant typed a screen name or a given name for the second chat participant and where the second chat participant typed a screen name or a given name of the first chat participant; and
program instructions to display the plurality of identified recorded messages in a private chat session sub-window.

16. The computer program product of claim 15, wherein identifying the plurality of recorded messages includes identifying the plurality of recorded messages in which the at least one second chat participant mentions the first chat participant.

17. The computer program product of claim 15, wherein displaying the plurality of identified messages includes categorizing the plurality of identified messages based on at least one of a plurality of timestamp information and a message posting chat participant.

18. The computer program product of claim 15, wherein the plurality of message collection rules includes at least one of a plurality of messages that include a user screen name and a plurality of messages that include a user actual given name.

19. The computer program product of claim 15, wherein the plurality of message tables includes a plurality of sub-tables associated with at least one of each of the plurality of chat participants and a plurality of timestamp information.

20. The computer program product of claim 15, wherein determining a first chat participant chooses to open a private chat session with at least one second chat participant includes automatically sending a private chat session invitation to the at least one second chat participant.

* * * * *